United States Patent
Lin (10) Patent No.: US 11,165,550 B2
(45) Date of Patent: Nov. 2, 2021

(54) RESOURCE MAPPING METHOD AND COMMUNICATION DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/337,921

(22) PCT Filed: Dec. 16, 2016

(86) PCT No.: PCT/CN2016/110538
§ 371 (c)(1),
(2) Date: Mar. 28, 2019

(87) PCT Pub. No.: WO2018/107500
PCT Pub. Date: Jun. 21, 2018

(65) Prior Publication Data
US 2019/0229880 A1    Jul. 25, 2019

(51) Int. Cl.
*H04L 5/00* (2006.01)
*H04W 72/04* (2009.01)
*H04W 88/06* (2009.01)
*H04L 27/26* (2006.01)

(52) U.S. Cl.
CPC ............ *H04L 5/0094* (2013.01); *H04L 5/003* (2013.01); *H04L 5/0044* (2013.01);
(Continued)

(58) Field of Classification Search
None
See application file for complete search history.

(56) References Cited

U.S. PATENT DOCUMENTS

| 8,848,682 B2 | 9/2014 | Guan et al. |
| 9,370,008 B2 | 6/2016 | Anto et al. |

(Continued)

FOREIGN PATENT DOCUMENTS

| CN | 101568128 | 10/2009 |
| CN | 103795668 | 5/2014 |

(Continued)

OTHER PUBLICATIONS

3GPP TSG RAN, Evolved Universal Terrestrial Radio Access (E-UTRA) Physical channels and modulation (Release 14), 3GPP TS 36.211 V140.0.0, Sep. 30, 2016.
(Continued)

*Primary Examiner* — Saba Tsegaye
(74) *Attorney, Agent, or Firm* — Hodgson Russ LLP (57) ABSTRACT

Disclosed are a resource mapping method and a communication device. Time-frequency resources for transmitting current data include a plurality of frequency bands, and sub-carrier spacings corresponding to the plurality of frequency bands are at least in part different. The method include: determining a unit time domain resource for resource mapping, a length of the unit time domain resource being equal to a symbol length corresponding to a minimum subcarrier spacing of the plurality of frequency bands; and performing resource mapping on the data in a plurality of unit time domain resources for transmitting the data according to a chronological order, wherein the resource mapping performed in each of the plurality of unit time domain resources is performed based on a preset mapping rule.

19 Claims, 10 Drawing Sheets

(52) U.S. Cl.
CPC ..... *H04L 27/2602* (2013.01); *H04W 72/0453* (2013.01); *H04W 88/06* (2013.01); *H04L 5/0005* (2013.01); *H04L 5/0007* (2013.01)

(56) References Cited

U.S. PATENT DOCUMENTS

| | | | |
|---|---|---|---|
| 2012/0099519 | A1 | 4/2012 | Kim et al. |
| 2016/0352551 | A1 | 12/2016 | Zhang et al. |
| 2018/0123848 | A1* | 5/2018 | Nammi ............... H04L 27/2646 |
| 2018/0146465 | A1* | 5/2018 | Li ....................... H04W 72/044 |
| 2019/0173716 | A1* | 6/2019 | Lyu ..................... H04J 1/065 |

FOREIGN PATENT DOCUMENTS

| | | |
|---|---|---|
| CN | 106231614 | 12/2016 |
| WO | 2008151555 | 12/2008 |
| WO | 2016130175 | 8/2016 |

OTHER PUBLICATIONS

WIPO, ISR for PCT/CN2016/110538, Jul. 11, 2017.
CNIPA, Second Office Action for CN Application No. 201680088842.4, dated Mar. 24, 2020.
Catt, "NR Time domain structure: slot and mini-slot and time interval," 3GPP TSG RAN WG1 Meeting #87, R1-1611366, Nov. 2016, 5 pages.
Oppo, "Discussion on forward compatibility of subframe structure for NR," 3GPP TSG RAN WG1 Meeting #86, R1-166608, Aug. 2016, 2 pages.
EPO, Office Action for EP Application No. 16924009.0, dated Jul. 9, 2019.
SIPO, Office Action in CN Application No. 201680088842.4, dated Jun. 12, 2020.
TIPO, First Office Action in TW Application No. 106141983.
Nokia, Alcatel-Lucent Shanghai Bell, "On the multiplexing between PUCCHs and PUSCH," 3GPP TSG RAN WG1 Meeting #89, R1-1708518, May 19, 2017, 3 Pages.
Huawei, Hisilicon, "Discussion on PSBCH contents and SLSS transmission procedure," 3GPP TSG RAN WG1 Meeting #86bis, R1-1608652, Oct. 14, 2016, 3 pages.
Intel Corporation, "UCI multiplexing onto PUSCH," 3GPP TSG RAN WG1 Meeting #89, R1-1707399, May 19, 2017, 4 pages.
EPO, Extended European Search Report for EP Application No. 20184843.9, dated Oct. 19, 2020.
TIPO, Notice of Rejection for TW Application No. 106141983, dated Dec. 30, 2020.

* cited by examiner

RESOURCE MAPPING METHOD AND COMMUNICATION DEVICE

CROSS-REFERENCE TO RELATED APPLICATION

This application is a National Stage Entry of International Application No. PCT/CN2016/110538, filed Dec. 16, 2016, the entire disclosure of which is incorporated herein by reference.

TECHNICAL FIELD

Embodiments of the present disclosure relate to the field of wireless communications, and more particularly, to a method and a communication device for resource mapping.

BACKGROUND

Currently, in a 5G system, or a new radio system (New Radio, "NR"), different basic parameter sets (numerology) may be used in different frequency bands in the same carrier, that is, parameters, such as different subcarrier spacings and different cyclic prefix lengths, may be used. When data is transmitted on different frequency bands within one carrier, since different basic parameters may be used, how to perform physical resource mapping based on different basic parameter sets is an urgent problem to be solved.

SUMMARY

The embodiments of the present disclosure provide a resource mapping method and a communication device, which solves the problem of how to perform resource mapping based on different subcarrier spacings.

In a first aspect, there is provided a method for resource mapping, wherein a time-frequency resource for transmitting current data includes a plurality of frequency bands, and subcarrier spacings corresponding to the plurality of frequency bands are at least partially different, the method including:

determining a unit time domain resource for resource mapping, a length of the unit time domain resource being equal to a symbol length corresponding to a minimum subcarrier spacing of the plurality of frequency bands; and performing resource mapping on the data in a plurality of unit time domain resources for transmitting the data according to a chronological order, wherein the resource mapping performed in each of the plurality of unit time domain resources is performed based on a preset mapping rule.

Therefore, based on different subcarrier spacings, unit time domain resources are determined and resource mapping is performed on the data within the unit time domain resources, thereby solving the problem of resource mapping based on different sub-carrier spacings. Since the transmitting-end device performs the resource mapping by using the unit time domain resource unit as a mapping unit, the receiving-end device does not need to start decoding until the data on the entire time domain resource for transmitting the current data is received, and fast demodulation of the receiving-end device can be guaranteed.

Since the subcarrier spacings used by different frequency bands may be different, and different subcarrier spacings result in different symbol lengths, the symbol lengths in different frequency bands are also different. Before performing data mapping, the terminal device first determines a unit time domain resource used for resource mapping, where the length of the unit time domain resource is a symbol length corresponding to a minimum subcarrier spacing among multiple subcarrier spacings of multiple frequency bands, in other words, the length of the unit time domain resource is the largest symbol length of the plurality of symbol lengths corresponding to the plurality of subcarrier spacings of the plurality of frequency bands. The unit time domain resource may also be referred to as a time domain resource unit or the like.

When performing resource mapping in each unit time domain resource, the resource mapping may be performed according to, for example, a chronological order, a preset frequency order, a preset subcarrier spacing order, and symbol information of the plurality of frequency bands such as a cutoff time or a start time of symbol.

Optionally, in an implementation manner of the first aspect, the mapping rule specifically includes: performing the resource mapping in the plurality of frequency bands sequentially according to a first frequency order, wherein the resource mapping in each of the plurality of frequency bands is sequentially performed in at least one symbol in each of the frequency bands according to a chronological order.

The first frequency order may be a frequency ascending order or a frequency descending order, or may be other preset frequency orders.

Optionally, in an implementation manner of the first aspect, the mapping rule specifically includes: performing the resource mapping in at least one symbol sequentially according to a cutoff time of the at least one symbol in the plurality of frequency bands.

Optionally, in an implementation manner of the first aspect, the mapping rule further includes: if the plurality of frequency bands include at least two symbols having the same cutoff time, performing the resource mapping in the at least two symbols sequentially based on a preset subcarrier spacing order according to subcarrier spacings of frequency bands to which the at least two symbols belong respectively, wherein the at least two symbols belong to different frequency bands.

Optionally, in an implementation manner of the first aspect, the mapping rule further includes: if the plurality of frequency bands include at least two symbols having the same cutoff time, performing the resource mapping in the at least two symbols based on a second frequency order according to frequencies corresponding to the frequency bands to which the at least two symbols belong respectively, wherein the at least two symbols belong to different frequency bands.

Optionally, in an implementation manner of the first aspect, the mapping rule further includes: in each symbol in the plurality of frequency bands, performing the resource mapping based on a third frequency order.

Optionally, in an implementation manner of the first aspect, the mapping rule further includes: performing the resource mapping sequentially in a plurality of subcarriers in the plurality of frequency bands based on a fourth frequency order.

Optionally, in an implementation manner of the first aspect, the mapping rule further includes: in each of the plurality of subcarriers, performing the resource mapping according to a chronological order.

Optionally, in an implementation manner of the first aspect, the method is performed by a terminal device or a network device.

In a second aspect, there is provided a communication device, and the communication device may be used to perform various processes in the method for resource mapping in the foregoing first aspect and various implementation manners. The time-frequency resource for transmitting current data includes a plurality of frequency bands, and sub-carrier spacings corresponding to the plurality of frequency bands are at least partially different, the communication device including:

a determining unit, configured to determine a unit time domain resource for resource mapping, a length of the unit time domain resource being equal to a symbol length corresponding to a minimum subcarrier spacing of the multiple frequency bands; and a mapping unit, configured to perform resource mapping on the data in a plurality of unit time domain resources used by the determining unit for transmitting the data according to a chronological order, wherein the resource mapping performed in each of the plurality of unit time domain resources is performed according to a preset mapping rule.

In a third aspect, there is provided a communication device, and the communication device includes a processor and a memory. The memory stores a program, and the processor executes the program for performing the respective processes in the methods for resource mapping described in the first aspect and various implementation manners described above. The processor is specifically configured to:

determine a unit time domain resource for resource mapping, a length of the unit time domain resource being equal to a symbol length corresponding to a minimum subcarrier spacing of the multiple frequency bands; and perform resource mapping on the data in a plurality of unit time domain resources used by the determining unit for transmitting the data according to a chronological order, wherein the resource mapping performed in each of the plurality of unit time domain resources is performed according to a preset mapping rule.

In a fourth aspect, there is provided a computer readable storage medium, the computer readable storage medium stores a program causing a terminal device to perform the first aspect described above, and any one of the various implementation manners of the method for resource mapping.

Based on the foregoing technical solutions, in the embodiments of the present disclosure, the unit time domain resource is determined based on different subcarrier spacings, and resource mapping is performed on the data in the unit time domain resource, thereby solving the problem of resource mapping based on different subcarrier spacings. Since the transmitting-end device performs resource mapping by using the unit time domain resource unit as a mapping unit, the receiving-end device does not need to start decoding until the data on the entire time domain resource for transmitting the current data is received, and fast demodulation of the receiving-end device can be guaranteed.

DETAILED DESCRIPTION

The technical solutions in the embodiments of the present disclosure will be described below with reference to the accompanying drawings.

It should be understood, the technical solutions of the embodiments of the present disclosure may be applied to various communications systems, for example: Global System of Mobile Communications (referred to as "GSM") system, Code Division Multiple Access (referred to as "CDMA") system, Wideband Code Division Multiple Access (referred to as "WCDMA") system, long Term Evolution (referred to as "LTE") system, LTE Frequency Division Duplex (referred to as "FDD") System, LTE Time Division Duplex (referred to as "TDD"), Universal Mobile Telecommunication System (referred to as "UMTS"), and future 5G communication systems.

The present disclosure describes various embodiments in connection with a terminal device. The terminal device may also refer to User Equipment (referred to as "UE"), an access terminal, a subscriber unit, a subscriber station, a mobile station, a mobile platform, a remote station, a remote terminal, a mobile device, a user terminal, a terminal, a wireless communication device, a user agent or a user apparatus. The access terminal may be a cellular phone, a cordless phone, a Session Initiation Protocol (referred to as "SIP") phone, a Wireless Local Loop (referred to as "WLL") station, or a Personal Digital Assistant (referred to as "PDA"), a handheld device with wireless communication capabilities, a computing device or other processing device connected to a wireless modem, an in-vehicle device, a wearable device, a terminal device in a future 5G network, or a terminal device in a future evolved PLMN network, or the like.

The present disclosure describes various embodiments in connection with a network device. The network device may be a device for communicating with the terminal device, for example, may be a base station (Base Transceiver Station, abbreviated as "BTS") in the GSM system or CDMA, or may be a base station (NodeB, referred to as "NB") in the WCDMA system, or may also be an evolved base station (Evolutional Node B, "eNB" or "eNodeB") in the LTE system, or the network device may be a relay station, an access point, an in-vehicle device, a wearable device, and a network side device in a future 5G network or a network device in a future evolved PLMN network.

Figure 1:
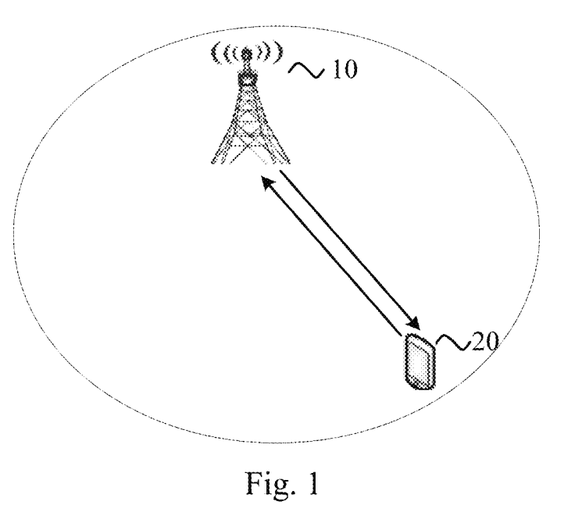
FIG. 1 is a schematic structural diagram of an application scenario according to an embodiment of the present disclosure.

FIG. 1 is a schematic diagram of an application scenario of the present disclosure. The communication system in FIG. 1 may include a network device 10 and a terminal device 20. The network device 10 is configured to provide communication services for the terminal device 20 and access the core network. The terminal device 20 accesses the network by searching for a synchronization signal, a broadcast signal, and the like transmitted by the network device 10, thereby performing communication with the network. The arrows shown in FIG. 1 may represent uplink/downlink transmissions by a cellular link between the terminal device 20 and the network device 10.

The network in the embodiments of the present disclosure may refer to a Public Land Mobile Network (referred to as "PLMN") or a Device to Device (referred to as "D2D") network or a Machine to Machine/Man (referred to as "M2M") network or other network. FIG. 1 is only a simplified schematic diagram for example, and the network may also include other terminal devices, which are not shown in FIG. 1.

Figure 2:
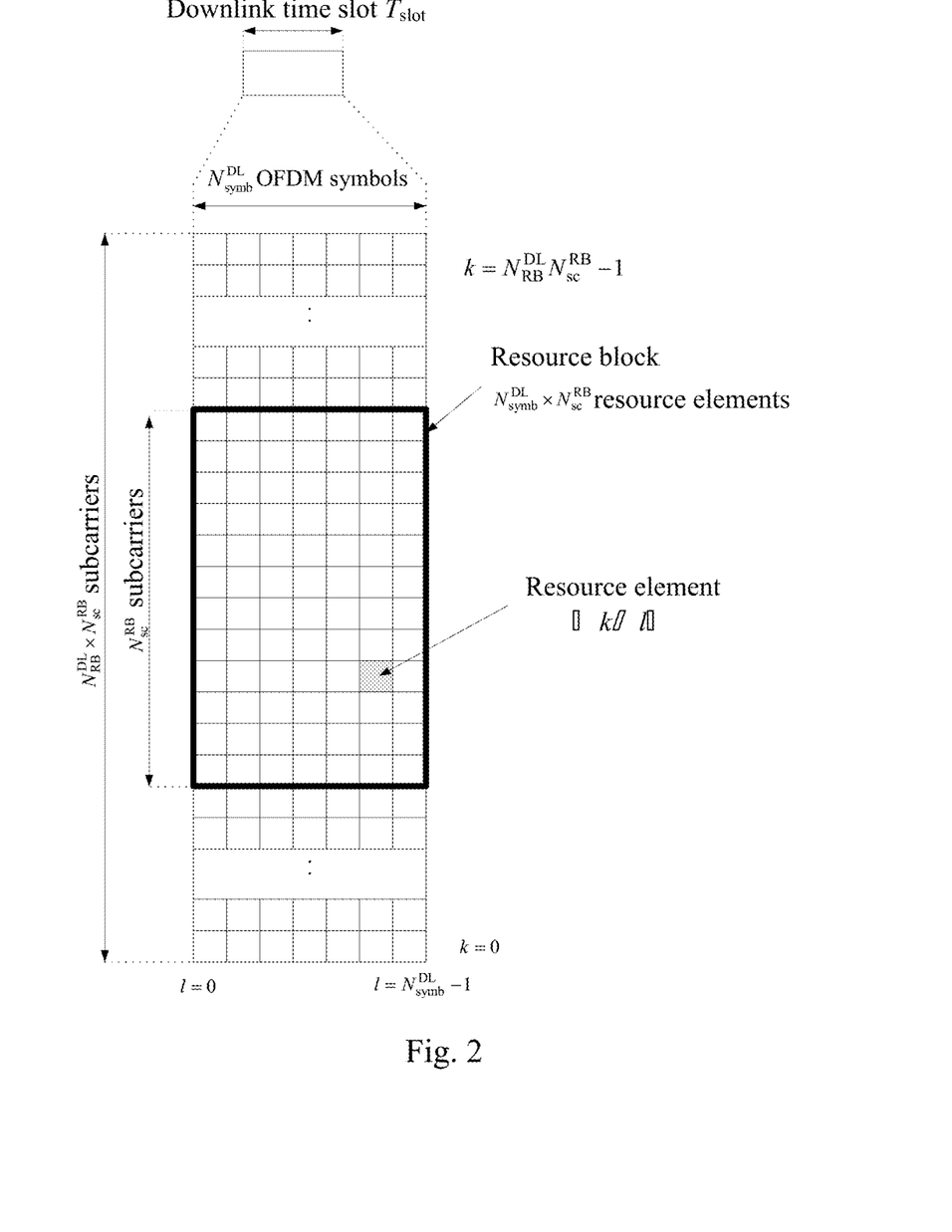
FIG. 2 is a schematic structural diagram of a downlink time-frequency resource in an LTE TDD system.

FIG. 2 is a schematic diagram showing the structure of a downlink time-frequency resource of an LTE TDD system. As shown in FIG. 2, each time slot includes $N_{symb}^{DL}$ OFDM symbols in the time domain, and $N_{RB}^{DL}$ Physical Resource Blocks (PRBs) in the frequency domain. Each PRB contains $N_{sc}^{RB}$ subcarriers in the frequency domain. Different working bandwidths are implemented by configuring different numbers of PRBs. For example, when the bandwidths are 1.4 MHz, 3 MHz, 5 MHz, 10 MHz, 15 MHz, 20 MHz, the number of PRBs are 6, 15, 25, 50, 75, 100 respectively. The value of the number of OFDM symbols $N_{symb}^{DL}$ is related to the type of Cyclic Prefix ("CP"). The LTE TDD system supports two CP types, namely, a normal CP and an extended CP.

Figure 3:
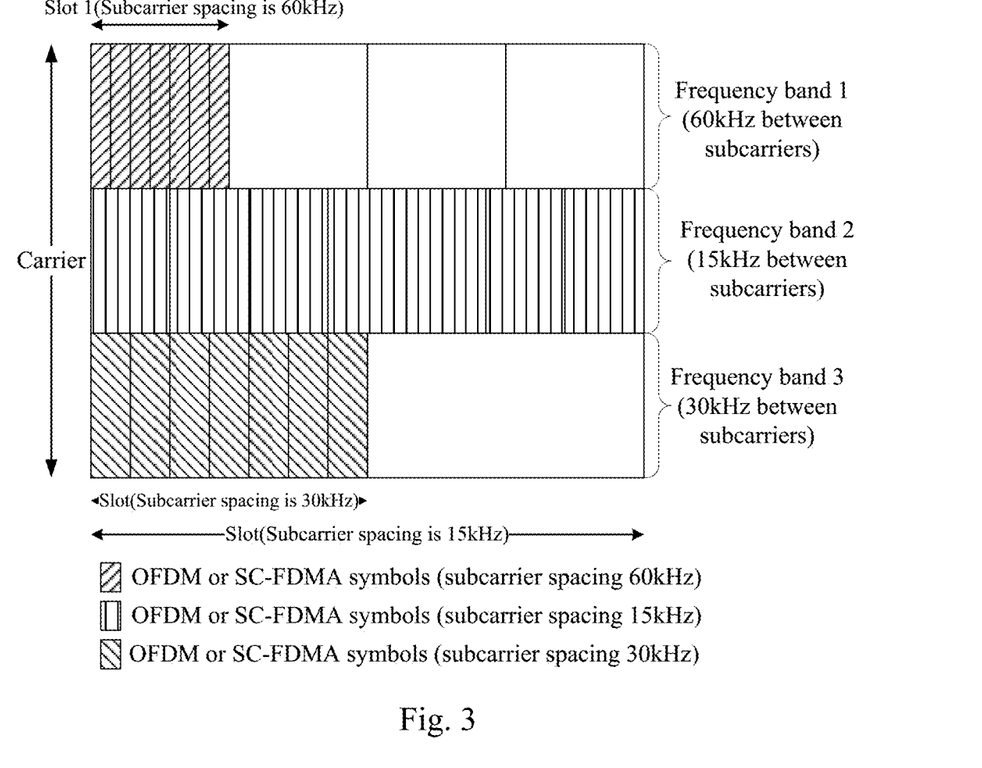
FIG. 3 is a schematic structural diagram of a time-frequency resource based on different subcarrier spacings according to an embodiment of the present disclosure.

However, in systems such as 5G, different basic parameter sets (numerologies) may be used on different frequency bands within the same carrier. For example, different subcarrier spacings, different cyclic prefix lengths, and the like may be used in different frequency bands. In each basic parameter set, one time slot includes seven symbols, for example, an Orthogonal Frequency Division Multiplexing ("OFDM") symbol or a Single Carrier Frequency Division Multiple Access (referred to as "SC-FDMA") symbol, and one physical resource block may include 12 subcarriers. For example, as shown in FIG. 3, the carrier shown in FIG. 3 includes three frequency bands, and the subcarrier spacings corresponding to individual frequency bands are different, and are respectively the subcarrier spacing 60 kHz, the subcarrier spacing 30 kHz, and the subcarrier spacing 15 kHz. The subcarrier spacings of the frequency bands are different, and thus the symbol lengths in individual frequency bands are also different, or the time slot lengths are different.

In this case, when the data to be transmitted needs to use multiple frequency bands in one carrier, the basic parameter sets used in the data transmission in different frequency bands, for example, the subcarrier spacings are different, and therefore the physical resource mapping needs to be performed based on different subcarrier spacings. The embodiments of the present disclosure solve the problem of how to perform physical resource mapping based on different subcarrier spacings.

It should be understood that the basic parameter set herein includes a sub-carrier spacing, which refers to a frequency interval between adjacent subcarriers, such as 15 kHz, 30 kHz, 60 kHz, and the like. The parameters in the basic parameter set include, but are not limited to, the subcarrier spacing. For example, the basic parameter set may also include other parameters, such as the number of subcarriers in a specific bandwidth and the number of subcarriers in the Physical Resource Block (referred to as "PRB"), the length of Orthogonal Frequency Division Multiplexing ("OFDM") symbol, and the number of points of the Fourier transform (such as Fast Fourier Transform ("FFT")) or inverse Fourier transform used to generate an OFDM signal (such as the Inverse Fast Fourier Transform ("IFFT")), the number of OFDM symbols in the transmission time interval (TTI), the number of TTIs included in a specific length of time and the length of the signal prefix, etc.

Figure 4:
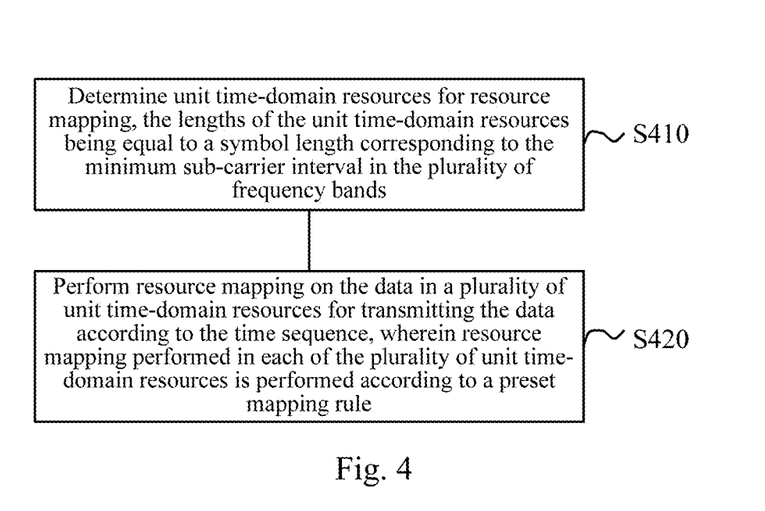
FIG. 4 is a schematic flowchart of a method for resource mapping according to an embodiment of the present disclosure.

FIG. 4 is a schematic flowchart of a method for resource mapping according to an embodiment of the present disclosure. The method described in FIG. 4 may be performed, for example, by the network device 10 or the terminal device 20 shown in FIG. 1. The description of the embodiment of the present disclosure is given by taking the terminal device as an execution body as an example, but the embodiments of the present disclosure are not limited thereto. When performing downlink transmission, the method may also be performed by the network device or the like. In this embodiment, the time-frequency resource used for transmitting the current data includes a plurality of frequency bands, and the sub-carrier spacings corresponding to the plurality of frequency bands are at least partially different.

As shown in FIG. 4, the specific process of the resource mapping includes the following steps.

In S410, a unit time domain resource used for resource mapping is determined. A length of the unit time domain resource is equal to a symbol length corresponding to a minimum subcarrier spacing of the plurality of frequency bands.

In S420, resource mapping is performed on the data in a plurality of unit time domain resources for transmitting the data according to a chronological order. The resource mapping performed in each of the plurality of unit time domain resources is performed based on a preset mapping rule.

Specifically, since the subcarrier spacings used by different frequency bands may be different, different subcarrier spacings result in different symbol lengths, and thus the symbol lengths in different frequency bands are also different. Before performing data mapping, the terminal device first determines a unit time domain resource used for resource mapping, where the length of the unit time domain resource is a symbol length corresponding to a minimum subcarrier spacing among multiple subcarrier spacings of multiple frequency bands, in other words, the length of the unit time domain resource is the largest symbol length of the plurality of symbol lengths corresponding to the plurality of subcarrier spacings of the plurality of frequency bands. The unit time domain resource may also be referred to as a time domain resource unit or the like.

After determining the unit time domain resource, the terminal device performs resource mapping on the data in a plurality of unit time domain resources for transmitting the data in chronological order. That is to say, when the terminal device performs resource mapping, the unit time domain resource is used as a mapping unit, and resource mapping is performed on multiple unit time domain resources sequentially.

Figure 5:
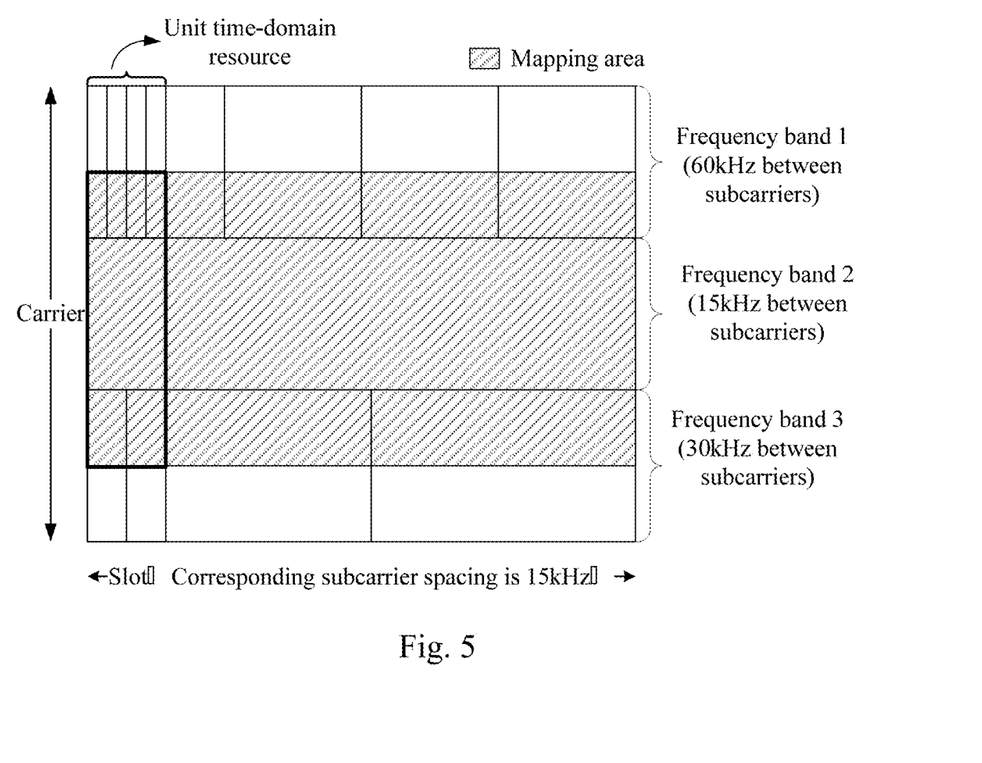
FIG. 5 is a schematic diagram of a unit time domain resource for resource mapping according to an embodiment of the present disclosure.

Taking FIG. 5 as an example, FIG. 5 is a schematic diagram of a unit time domain resource for resource mapping, the carrier for transmitting current data includes three frequency bands, that is, a frequency band 1, a frequency band 2, and a frequency band 3. The sub-carrier spacing corresponding to the frequency band 1 is 30 kHz, the subcarrier spacing corresponding to the frequency band 2 is 15 kHz, and the subcarrier spacing corresponding to the frequency band 3 is 60 kHz. Therefore, the unit time domain resource is a symbol length corresponding to the subcarrier spacing of 15 kHz, as shown in FIG. 5, and the shaded portion indicates a mapping area, for example, a shared channel such as a mapped Physical Downlink Shared CHannel (PDSCH) or a Physical Uplink Shared CHannel (PUSCH). When resource mapping is performed, resource mapping is performed in each unit time domain resource in chronological order, thereby completing resource mapping for multiple unit time domain resources.

In the embodiments of the present disclosure, the unit time domain resources are determined based on different subcarrier spacings, and the data is mapped in the unit time domain resources, which solves the problem of resource mapping based on different sub-carrier spacings. Since the transmitting-end device performs resource mapping by using the unit time domain resource unit as a mapping unit, the receiving-end device does not need to start decoding until the data on the entire time domain resource for transmitting the current data is received, and fast demodulation of the receiving-end device can be guaranteed.

Optionally, the terminal device, the network device or the like may perform resource mapping in each unit time domain resource according to at least one of the following information: a time sequence, a preset frequency order, a preset subcarrier spacing order, and information of the symbols in the plurality of frequency bands, such as a cut-off time or a start time of the symbol.

The mapping rule in the embodiment of the present disclosure is described in detail below with reference to FIG. 6 to FIG. 8. The three mapping rules provided by the embodiments of the present disclosure are described below.

Mapping Rule 1

Optionally, the mapping rule specifically includes: performing resource mapping in the plurality of frequency bands sequentially according to a first frequency order, wherein the resource mapping in each of the plurality of frequency bands is sequentially performed in at least one symbol in each of the frequency bands according to chronological order.

The first frequency order may be a frequency ascending order or a frequency descending order, or may be other preset frequency orders.

Figure 6A:
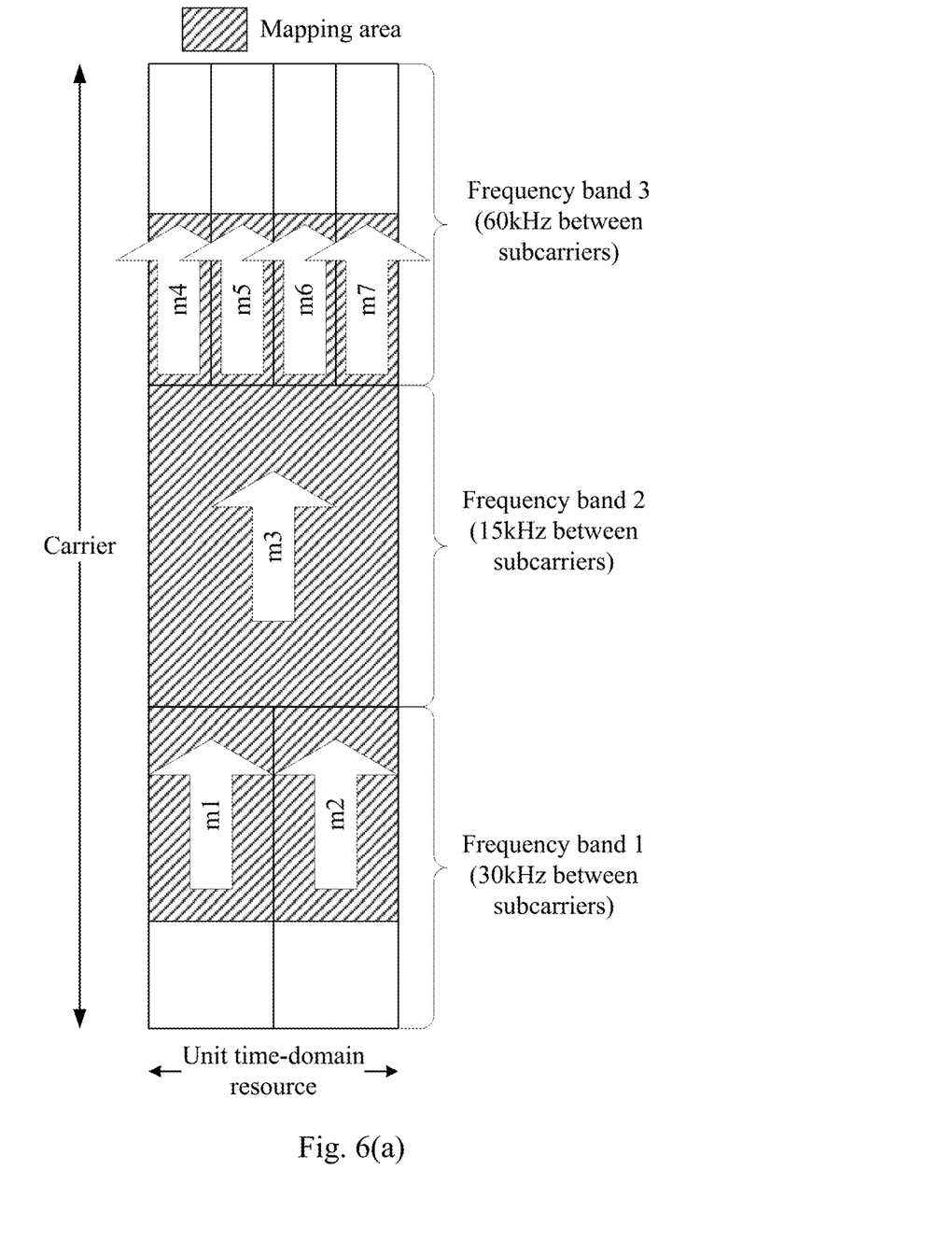
FIG. 6(a) is a schematic diagram of a resource mapping in a unit time domain resource according to an embodiment of the present disclosure.

For example, FIG. 6(a) shows a resource mapping situation in one unit time domain resource. In the frequency band 1, the frequency band 2, and the frequency band 3, the resource mapping is performed sequentially on the three frequency bands according to the frequency magnitudes corresponding to the three frequency bands following the first frequency order, assuming that the first frequency order is the frequency ascending order. As shown in FIG. 6(a), the three frequency bands are sequentially arranged in the ascending order of frequency, i.e., the frequency band 1, the frequency band 2, and the frequency band 3, and the corresponding subcarrier spacings are 30 kHz, 15 kHz, and 60 kHz, respectively. Then, the terminal device first performs resource mapping in the frequency band 1, and then performs resource mapping in the frequency band 2, and then performs resource mapping in the frequency band 3.

The resource mapping performed in each frequency band is sequentially performed in at least one symbol of each frequency band according to chronological order.

That is to say, the resource mapping in each frequency band is based on the symbol length corresponding to the subcarrier spacing of the frequency band as a mapping unit, and at least one symbol in the frequency band is sequentially mapped in chronological order. For example, as shown in FIG. 6(a), in the unit time domain resource unit, the frequency band 1 includes two symbols m1 and m2, and the lengths of the two symbols are both the symbol length corresponding to the subcarrier spacing of 30 kHz, and the mapping order is m1 first and then m2; the frequency band 2 includes one symbol m3, the length of this symbol is the symbol length corresponding to the subcarrier spacing of 15 kHz; and the frequency band 3 includes four symbols m4, m5, m6 and m7, the lengths of the four symbols are all the symbol length corresponding to the subcarrier spacing of 60 kHz, i.e., the mapping order is m4, m5, m6, and m7.

Figure 6B:
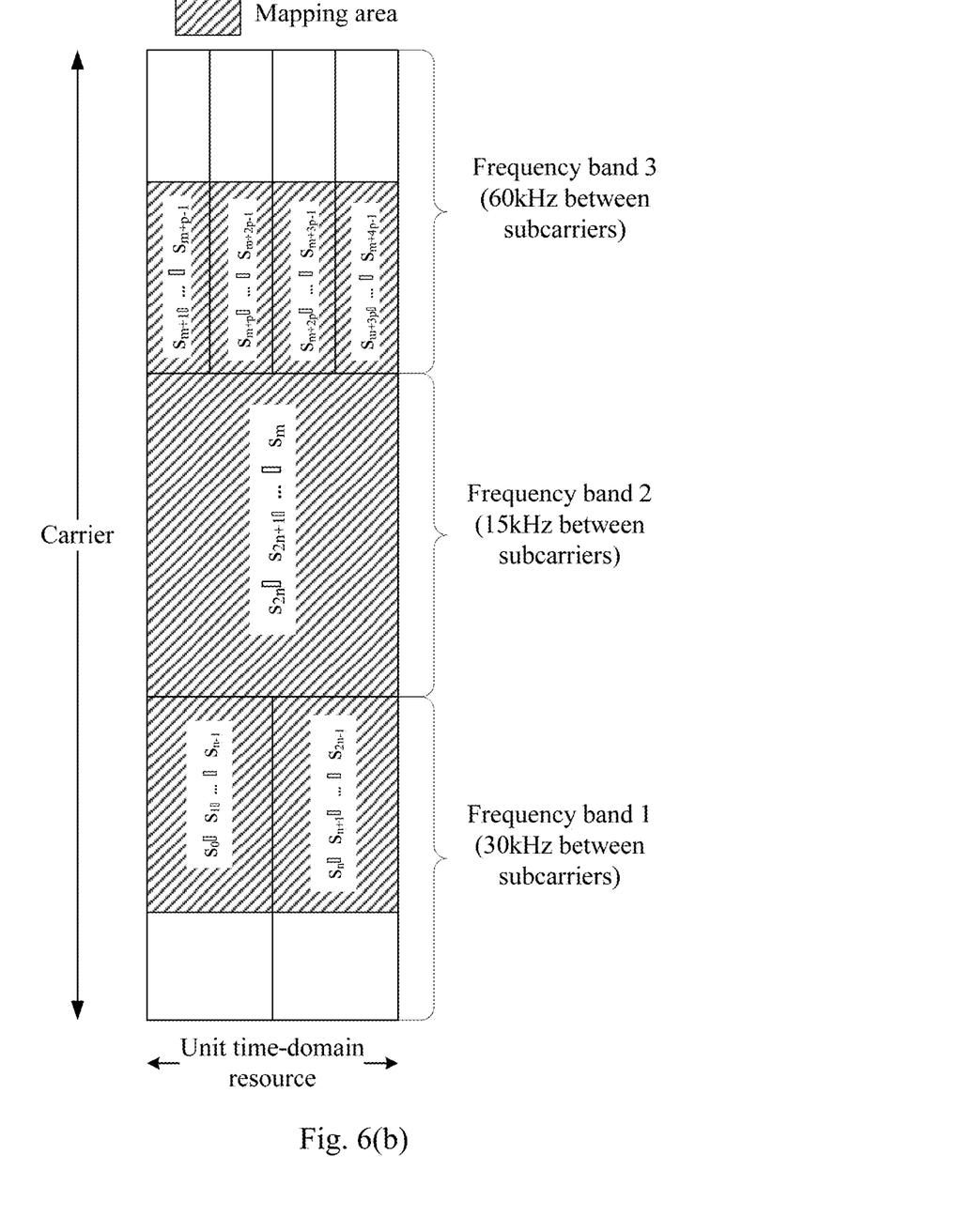
FIG. 6(b) is a schematic diagram of a resource mapping in a unit time domain resource according to an embodiment of the present disclosure.

In summary, in this embodiment, in the unit time domain resource unit, the resource mapping is performed in the order of m1, m2, m3, m4, m5, m6, and m7, and the mapping result is as shown in FIG. 6(b), $s_0$ to $s_{n-1}$ are the data mapped on the symbol m1, $s_n$ to $s_{2n-1}$ are the data mapped on the symbol m2, $s_{2n}$ to $s_m$ are the data mapped on the symbol m3, and $s_{m+1}$ to $s_{m+p-1}$ are the data mapped on the symbol m4, $s_{m+p}$ to $s_{m+2p-1}$ are the data mapped on the symbol m5, $s_{m+2p}$ to $s_{m+3p-1}$ are the data mapped on the symbol m6, and $s_{m+3p}$ to $s_{m+4p-1}$ are the data mapped on the symbol m7.

Optionally, resource mapping may be performed according to the third frequency order in each of the at least one symbol of the plurality of frequency bands. For example, as shown in FIG. 6(a), in each of at least one of symbols of the plurality of frequency bands, the direction of the arrow indicates the order of resource mapping within the symbol.

It should be understood that the resource mapping in each of the plurality of frequency bands may be performed sequentially in at least one symbol in each frequency band according to chronological order, or the mapping in the frequency band may be performed according to other manners, for example, the resource mapping is performed sequentially in each subcarrier according to the order of the subcarriers in the frequency band.

Mapping Rule 2

Optionally, the mapping rule specifically includes: performing resource mapping in the at least one symbol according to a cutoff time of at least one symbol in the plurality of frequency bands.

Specifically, in at least one symbol of the plurality of frequency bands, each symbol has its own start time and cutoff time, and resource mapping may be performed sequentially in the at least one symbol according to the cutoff time of at least one symbol of the plurality of frequency bands, or resource mapping may be performed in the at least one symbol sequentially according to the start time of at least one symbol of the plurality of frequency bands.

Further, in the cutoff time of at least one symbol of the plurality of frequency bands, there may be a situation in which the cutoff time of at least two symbols are the same. In this case, the processing may be performed in two manners. One manner is: if the multiple frequency bands includes at least two symbols having the same cutoff time, then performing resource mapping in the at least two symbols according to the subcarrier spacings of the frequency bands to which the at least two symbols belong respectively based on a preset subcarrier spacing order, wherein the at least two symbols belong to different frequency bands. The other manner is: if the plurality of frequency bands include at least two symbols with the same cutoff time, performing resource mapping in the at least two symbols sequentially according to the frequencies corresponding to the frequency bands to which the at least two symbols belong respectively based on the second frequency order, wherein the at least two symbols belong to different frequency bands, and the second frequency order may be a frequency ascending order or a frequency descending order, or may be other preset frequency orders. Hereinafter, the two manners are described separately.

Manner 1

Figure 7A:
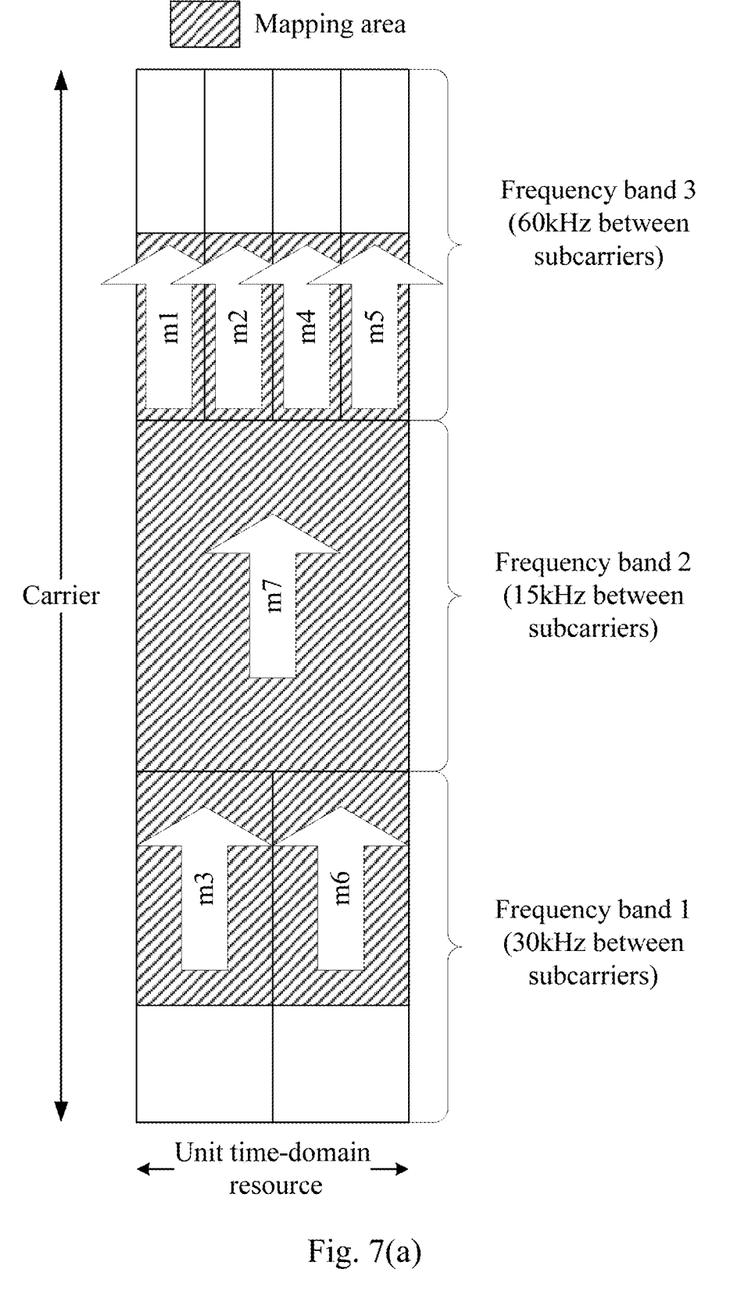
FIG. 7(a) is a schematic diagram of a resource mapping in a unit time domain resource according to an embodiment of the present disclosure.

Taking FIG. 7(a) as an example, FIG. 7(a) shows a resource mapping situation in a unit time domain resource. In FIG. 7(a), the frequency band 1 includes two symbols m1 and m2, and the lengths of the two symbols are both the symbol length corresponding to the subcarrier spacing of 30 kHz; the frequency band 2 includes the symbol m3, and the length of this symbol is the symbol length corresponding to the subcarrier spacing of 15 kHz; and the frequency band 3 includes four symbols m4, m5, m6, and m7, and the lengths of the four symbols are all the symbol length corresponding to the subcarrier spacing of 60 kHz.

In the symbol m1 to the symbol m7, the cutoff time of the symbol m1 is the earliest, and the terminal device preferentially performs resource mapping on the symbol m1. Then, the resource mapping is performed on the symbol m2 and the symbol m3. Since the cutoff time of the symbol m2 and the cutoff time of the symbol m3 are the same, the terminal device sequentially performs resource mapping on the symbol m2 and the symbol m3 according to the preset subcarrier spacing order, assuming that the subcarrier spacing order is preferentially mapping the symbols in the frequency band with a large subcarrier spacing, the terminal device first performs resource mapping on the symbol m2 and then performs resource mapping on the symbol m3. According to the cutoff time of the symbols, the terminal device continues to perform resource mapping on the symbol m4; then, the terminal device performs resource mapping on the symbol m5, the symbol m6, and the symbol m7. Since the cutoff time of the symbol m5, the symbol m6, and the symbol m7 are the same, and the terminal device sequentially performs resource mapping on the symbol m2 and the symbol m3 according to the preset subcarrier spacing order, the terminal device performs resource mapping on the symbol m5 first, then performs resource mapping on the symbol m6, and finally performs resource mapping on the symbol m7. Therefore, in this embodiment, in the unit time domain resource unit, resource mapping is performed in the order of m1, m2, m3, m4, m5, m6, and m7.

Manner 2

Figure 7B:
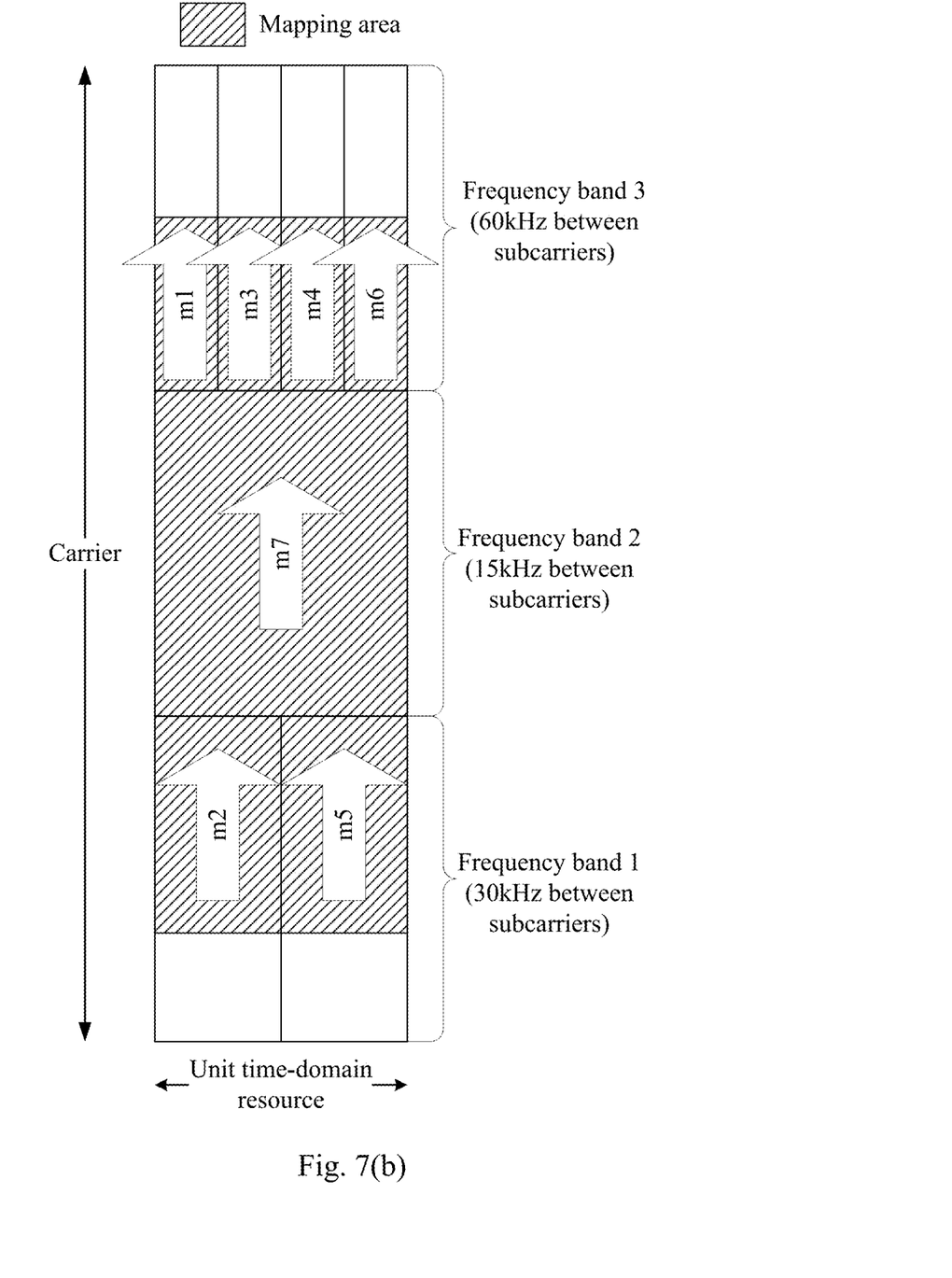
FIG. 7(b) is a schematic diagram of a resource mapping in a unit time domain resource according to an embodiment of the present disclosure.

Taking FIG. 7(b) as an example, FIG. 7(b) shows a resource mapping situation in a unit time domain resource. In FIG. 7(b), the frequency band 1 includes two symbols m1 and m2, the length of the two symbols are both the symbol length corresponding to the subcarrier spacing of 30 kHz; the frequency band 2 includes the symbol m3, and the length of this symbol is the symbol length corresponding to the subcarrier spacing of 15 kHz; and the frequency band 3 includes four symbols m4, m5, m6, and m7, and the lengths of the four symbols are all the symbol length corresponding to the subcarrier spacing of 60 kHz.

In the symbol m1 to the symbol m7, the cutoff time of the symbol m1 is the earliest, and the terminal device preferentially performs resource mapping on the symbol m1. Then, the terminal device performs resource mapping on the symbol m2 and the symbol m3. Since the cutoff time of the symbol m2 and the cutoff time of the symbol m3 are the same, and the terminal device sequentially performs resource mapping on the symbol m2 and the symbol m3 according to the second frequency order, assuming that the second frequency order is the frequency ascending order, and the frequency corresponding to the frequency band to which the symbol m2 belongs is greater than the frequency corresponding to the frequency band to which the symbol m3 belongs, then the terminal device first performs resource mapping on the symbol m2, and then performs resource mapping on the symbol m3. According to the cut-off time of the symbols, the terminal device continues to perform resource mapping on the symbol m4. After that, the terminal device performs resource mapping on the symbol m5, symbol m6 and symbol m7. Since the symbol m5, the symbol m6 and the symbol m7 have the same cut-off time, and the terminal device performs resource mapping on the symbol m2 and the symbol m3 sequentially according to the second frequency order, the terminal device performs resource mapping on the symbol m5 first, then performs resource mapping on the symbol m6, and finally performs resource mapping on the symbol m7. Therefore, in this embodiment, in the unit time domain resource unit, resource mapping is performed in the order of m1, m2, m3, m4, m5, m6, and m7.

Optionally, in this embodiment, within each of the at least one symbol in the plurality of frequency bands, the resource mapping may be performed according to the third frequency order. The third frequency order may be a frequency ascending order or a frequency descending order, or may be other preset frequency orders. For example, as shown in FIGS. 7(a) and 7(b), within each of the at least one symbol, the direction of the arrow indicates the order of resource mapping within the symbol.

Mapping Rule 3

Optionally, the mapping rule specifically includes: performing resource mapping in multiple subcarriers in the multiple frequency bands according to a fourth frequency order.

Specifically, in a unit time domain resource, each of the plurality of frequency bands includes at least one subcarrier, and when performing resource mapping, resource mapping is sequentially performed in multiple subcarriers in multiple frequency bands by using the subcarrier as a mapping unit according to time and frequency order.

Figure 8:
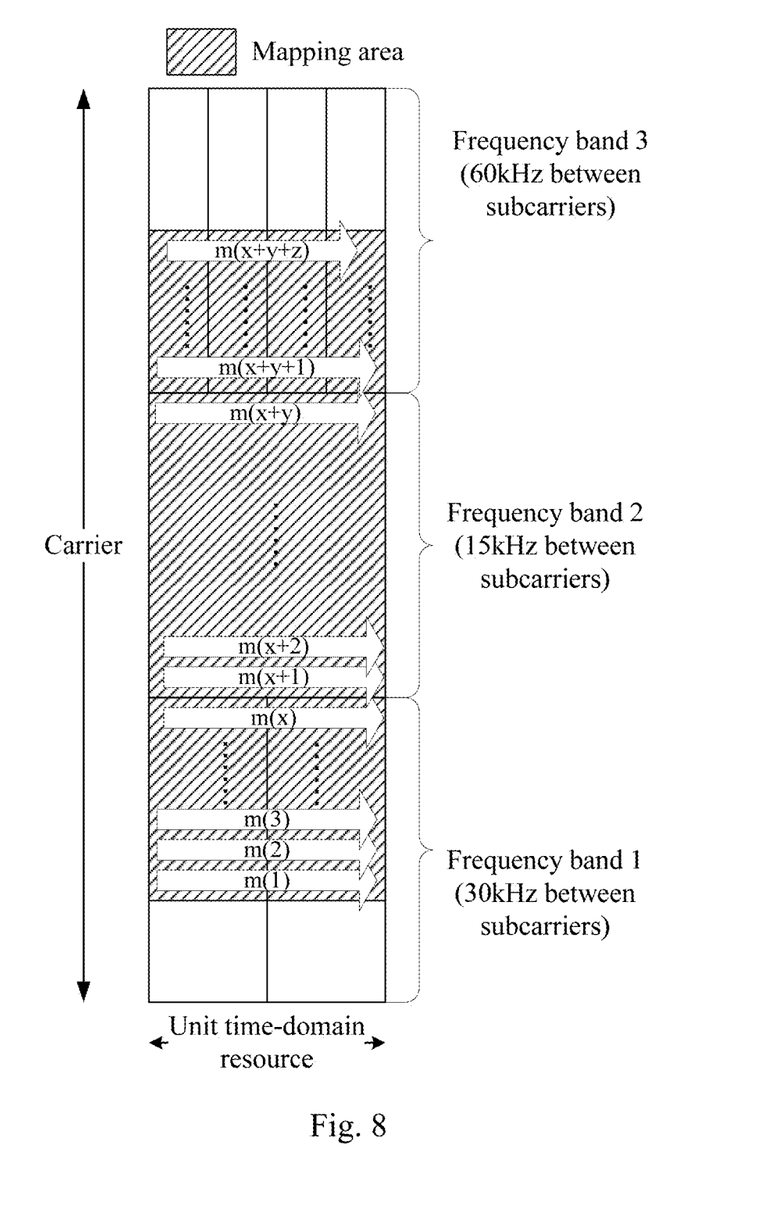
FIG. 8 is a schematic diagram of a resource mapping in a unit time domain resource according to an embodiment of the present disclosure.

Taking FIG. 8 as an example, FIG. 8 shows a resource mapping situation in a unit time domain resource, where x is the number of subcarriers in a frequency band with a subcarrier spacing of 30 kHz, and y is the number of subcarriers in a frequency band with a subcarrier spacing of 15 kHz, and z is the number of subcarriers in a frequency band with a subcarrier spacing of 60 kHz.

Assuming that the fourth frequency order is the frequency ascending order, according to the frequency magnitude corresponding to the plurality of subcarriers in the plurality of frequency bands, the terminal device performs resource mapping according to the order of the symbol m(1), the symbol m(2), . . . , the symbol m (x), the symbol m(x+1), . . . , the symbol m(x+y), the symbol m(x+y+1), . . . , the symbol m(x+y+z).

Optionally, when performing resource mapping in each of the multiple subcarriers, resource mapping may be performed according to chronological order. For example, as shown in FIG. 8, in each subcarrier, the direction of the arrow indicates the order of resource mapping within the sub-carrier.

It should be understood that, in various embodiments of the present disclosure, the magnitude of the sequence numbers of the above processes does not mean the order of execution, and the order of execution of each process should be determined by its function and internal logic, and should not limit the implementation process of the embodiments of the present disclosure.

The method for resource mapping according to an embodiment of the present disclosure is described in detail above, and a communication device according to an embodiment of the present disclosure will be described below. It should be understood that the communication device of the embodiments of the present disclosure may perform the foregoing various methods of the embodiments of the present disclosure, that is, the specific working processes of the following various devices may refer to the corresponding processes in the foregoing method embodiments.

Figure 9:
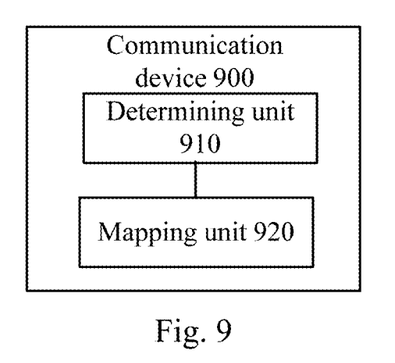
FIG. 9 is a schematic block diagram of a communication device according to an embodiment of the present disclosure.

FIG. 9 shows a schematic block diagram of a communication device 900 according to an embodiment of the present disclosure. The communication device may be, for example, a terminal device or a network side device. As shown in FIG. 9, the communication device 900 includes a determining unit 910 and a mapping unit 920.

The determining unit 910 is configured to determine a unit time domain resource used for resource mapping, where a length of the unit time domain resource is equal to a symbol length corresponding to a minimum subcarrier spacing of the multiple frequency bands.

The mapping unit 920 is configured to perform resource mapping on the data in a plurality of unit time domain resources used for transmitting the data determined by the determining unit 910 according to a chronological order, where, the resource mapping performed in each of the plurality of unit time domain resources is performed according to a preset mapping rule.

Therefore, based on different subcarrier spacings, the unit time domain resources are determined and resource mapping is performed within the unit time domain resources, which solves the problem of resource mapping based on different sub-carrier spacings. Since the transmitting-end device performs resource mapping by using the unit time domain resource unit as a mapping unit, the receiving-end device does not need to start decoding until the data on the entire time domain resource for transmitting the current data is received, and fast demodulation the receiving-end device can be guaranteed.

Optionally, the mapping rule specifically includes: performing resource mapping in the plurality of frequency bands sequentially according to a first frequency order, where resource mapping in each of the multiple frequency bands is performed sequentially in at least one of the symbols in each of the frequency bands based on chronological order.

Optionally, the mapping rule specifically includes: performing resource mapping in the at least one symbol sequentially according to a cutoff time of at least one symbol of the plurality of frequency bands.

Optionally, the mapping rule further includes: if the plurality of frequency bands include at least two symbols with the same cutoff time, performing resource mapping within the at least two symbols sequentially according to the subcarrier spacings of the frequency bands to which the at least two symbols belong respectively based on a preset sub-carrier spacing, wherein the at least two symbols belong to different frequency bands.

Optionally, the mapping rule further includes: if the plurality of frequency bands include at least two symbols with the same cutoff time, performing resource mapping within the at least two symbols according to the frequencies corresponding to the frequency bands to which the at least two symbols belong respectively based on a second frequency order, wherein the at least two symbols belong to different frequency bands.

Optionally, the mapping rule further includes: performing resource mapping in each symbol of the plurality of frequency bands according to a third frequency order.

Optionally, the mapping rule further includes: performing resource mapping in multiple subcarriers in the multiple frequency bands according to a fourth frequency order.

Optionally, the mapping rule further includes: performing resource mapping within each of the plurality of subcarriers according to chronological order.

Optionally, the communication device is a terminal device or a network device.

Figure 10:
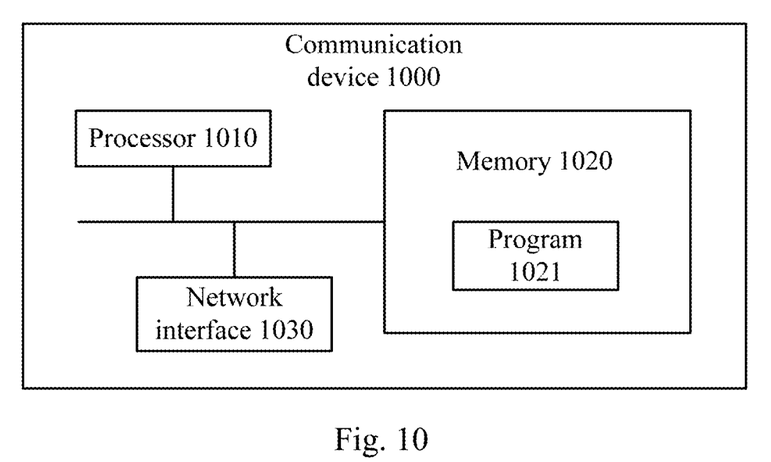
FIG. 10 is a schematic structural diagram of a communication device according to an embodiment of the present disclosure.

It should be noted that in the embodiments of the present disclosure, the determining unit 910 and the mapping unit 920 may be implemented by a processor. As shown in FIG. 10, the communication device 1000 may include at least one processor 1010, at least one network interface 1030 or other communication interface, a memory 1020, and the like. The processor 1010, the memory 1020, and the network interface 1030 may communicate with one another via internal connection paths for transmitting control signals and/or data signals. The memory 1020 may be used to map related information such as a rule and a subcarrier spacing, and may also be used to store the program 1021 and the like executed by the processor 1010. The processor 1010 is configured to execute executable instructions, such as computer programs, stored in the memory 1020. The memory 1020 may include a high speed Random Access Memory (RAM), and may also include a non-volatile memory such as at least one disk memory. The communication connection with at least one other network element may be implemented by at least one network interface 1030 (which may be wired or wireless). In some implementation manners, the processor 1010 executes a program for performing some operations:

determining a unit time domain resource for resource mapping, a length of the unit time domain resource being equal to a symbol length corresponding to a minimum subcarrier spacing of the plurality of frequency bands; and performing resource mapping on the data in a plurality of unit time domain resources for transmitting the data according to a chronological order, wherein the resource mapping performed in each unit time domain resource in the plurality of unit time domain resources is performed based on a preset mapping rule.

Optionally, the mapping rule specifically includes: performing resource mapping in the plurality of frequency bands sequentially according to a first frequency order, where the resource mapping in each of the plurality of frequency bands is performed sequentially in at least one symbol in each of the frequency bands based on chronological order.

Optionally, the mapping rule specifically includes: performing resource mapping in the at least one symbol sequentially according to a cutoff time of at least one symbol of the plurality of frequency bands.

Optionally, the mapping rule further includes: if the plurality of frequency bands include at least two symbols with the same cutoff time, sequentially performing resource mapping within the at least two symbols according to the subcarrier spacings of the frequency bands to which the at least two symbols belong respectively based on a preset sub-carrier spacing order, wherein the at least two symbols belong to different frequency bands.

Optionally, the mapping rule further includes: if the plurality of frequency bands include at least two symbols with the same cutoff time, resource mapping is performed within the at least two symbols sequentially according to the frequencies corresponding to the frequency bands to which the at least two symbols belong, based on a second frequency order, wherein the at least two symbols belong to different frequency bands.

Optionally, the mapping rule further includes: performing resource mapping according to a third frequency order in each symbol of the plurality of frequency bands.

Optionally, the mapping rule further includes: performing resource mapping in multiple subcarriers in the multiple frequency bands according to a fourth frequency order.

Optionally, the mapping rule further includes: performing resource mapping within each of the plurality of subcarriers according to chronological order.

Optionally, the communication device is a terminal device or a network device.

Figure 11:
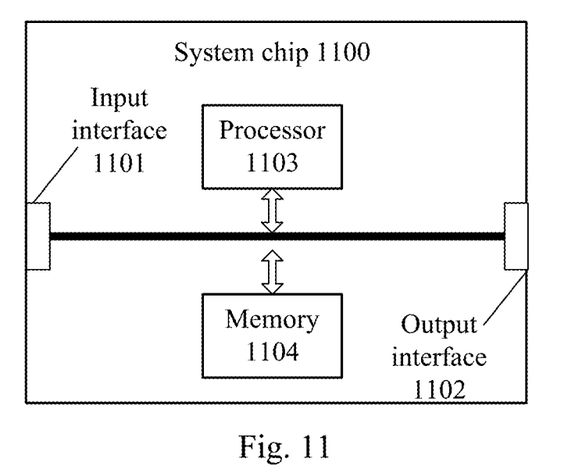
FIG. 11 is a schematic structural diagram of a system chip according to an embodiment of the present disclosure.

FIG. 11 is a schematic structural diagram of a system chip according to an embodiment of the present disclosure. The system chip 1100 of FIG. 11 includes an input interface 1101, an output interface 1102, at least one processor 1103, and a memory 1104. The input interface 1101, the output interface 1102, the processor 1103, and the memory 1104 are interconnected by an internal connection path. The processor 1103 is configured to execute code in the memory 1104. When the code is executed, the processor 1103 may implement the methods of FIG. 4 to FIG. 8.

It should be understood that, in various embodiments of the present disclosure, the sequence numbers of the above processes does not mean the order of execution, and the order of execution of each process should be determined by its function and internal logic, and should not limit the implementation process of the embodiments of the present disclosure.

Those of ordinary skill in the art will appreciate that the units and algorithm steps of individual examples described in connection with the embodiments disclosed herein can be implemented in electronic hardware or a combination of computer software and electronic hardware. Whether these functions are performed in hardware or software depends on the specific application and design constraints of the technical solution. A person skilled in the art can use different methods for implementing the described functions for each particular application, but such implementation should not be considered to be beyond the scope of the present application.

In the several embodiments provided by the present application, it should be understood that the disclosed systems, devices, and methods may be implemented in other manners. For example, the device embodiments described above are merely illustrative. For example, the division of the unit is only a logical function division. In actual implementation, there may be other division manner, for example, multiple units or components may be combined or may be integrated into another system, or some features may be ignored or not executed. In addition, the coupling or direct coupling or communication connection shown or discussed herein may be an indirect coupling or communication connection through some interfaces, devices or units, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiments.

In addition, each functional unit in each embodiment of the present application may be integrated into one processing unit, or each unit may exist physically and separately, or two or more units may be integrated into one unit.

The functions may be stored in a computer readable storage medium if implemented in the form of a software functional unit and sold or used as a standalone product. In view of this, the technical solution of the present disclosure, or the part of the solutions contributing to the prior art or the part of the technical solutions, may be embodied in the form of a software product, and the computer software product is stored in a storage medium and includes instructions for causing a computer device (which may be a personal computer, server, or network device, etc.) to perform all or part of the steps of the methods described in various embodiments of the present disclosure. The foregoing storage medium may include various mediums for storing program codes, such as a USB drive, a mobile hard disk, a Read-Only Memory (ROM), a Random Access Memory (RAM), a magnetic disk, or an optical disk.

The above is only the specific embodiments of the present disclosure, and the protection scope of the present disclosure is not limited thereto. Any of changes or substitutions that could be thought of by the ordinary skill in the art within the technical scope of the present disclosure should be covered by the protection scope of the present disclosure. Therefore, the protection scope of the present disclosure should be determined by the protection scope of the appended claims.

What is claimed is:

1. A method for resource mapping, wherein a time-frequency resource for transmitting current data comprises a plurality of frequency bands, and sub-carrier spacings corresponding to the plurality of frequency bands are at least partially different, the method comprising:
    determining a unit time domain resource for resource mapping, a length of the unit time domain resource being equal to a symbol length corresponding to a minimum subcarrier spacing of the plurality of frequency bands; and
    performing resource mapping on the data in a plurality of unit time domain resources for transmitting the data according to an increasing order in time domain, wherein the resource mapping performed in each of the plurality of unit time domain resources is performed based on a preset mapping rule.

2. The method according to claim 1, wherein the mapping rule comprises:
    performing the resource mapping in the plurality of frequency bands sequentially according to a first frequency order, wherein the resource mapping in each of the plurality of frequency bands is sequentially performed in at least one symbol in each of the frequency bands according to a chronological order.

3. The method according to claim 2, wherein the mapping rule further comprises:
    in each symbol in the plurality of frequency bands, performing the resource mapping based on a third frequency order.

4. The method according to claim 1, wherein the mapping rule comprises:
performing the resource mapping in at least one symbol sequentially according to a cutoff time of the at least one symbol in the plurality of frequency bands.

5. The method according to claim 4, wherein the mapping rule further comprises:
if the plurality of frequency bands comprise at least two symbols having the same cutoff time, performing the resource mapping in the at least two symbols sequentially based on a preset subcarrier spacing order according to subcarrier spacings of frequency bands to which the at least two symbols belong respectively, wherein the at least two symbols belong to different frequency bands.

6. The method according to claim 4, wherein the mapping rule further comprises:
if the plurality of frequency bands comprise at least two symbols having the same cutoff time, performing the resource mapping in the at least two symbols based on a second frequency order according to frequencies corresponding to the frequency bands to which the at least two symbols belong respectively, wherein the at least two symbols belong to different frequency bands.

7. The method according to claim 1, wherein the mapping rule further comprises:
performing the resource mapping sequentially in a plurality of subcarriers in the plurality of frequency bands based on a fourth frequency order.

8. The method according to claim 7, wherein the mapping rule further comprises:
in each of the plurality of subcarriers, performing the resource mapping according to a chronological order.

9. The method according to claim 1, wherein the preset mapping rule further comprises: an increasing order in time domain within each unit time domain resource of the plurality of unit time domain resources.

10. A communication device, wherein a time-frequency resource for transmitting current data comprises a plurality of frequency bands, and sub-carrier spacings corresponding to the plurality of frequency bands are at least partially different, the device comprising:
a processor; and
a memory for storing instructions executable by the processor;
wherein the processor is configured to:
determine a unit time domain resource for resource mapping, a length of the unit time domain resource being equal to a symbol length corresponding to a minimum subcarrier spacing of the plurality of frequency bands; and
perform resource mapping on the data in a plurality of unit time domain resources for transmitting the data according to an increasing order in time domain, wherein the resource mapping performed in each of the plurality of unit time domain resources is performed according to a preset mapping rule.

11. The communication device according to claim 10, wherein the mapping rule comprises:
performing the resource mapping in the plurality of frequency bands sequentially according to a first frequency order, wherein the resource mapping in each of the plurality of frequency bands is sequentially performed in at least one symbol in each of the frequency bands according to a chronological order.

12. The communication device according to claim 11, wherein the mapping rule comprises:
performing the resource mapping in at least one symbol sequentially according to a cutoff time of the at least one symbol in the plurality of frequency bands.

13. The communication device according to claim 12, wherein the mapping rule further comprises:
if the plurality of frequency bands comprise at least two symbols having the same cutoff time, performing the resource mapping in the at least two symbols sequentially based on a preset subcarrier spacing order according to subcarrier spacings of frequency bands to which the at least two symbols belong respectively, wherein the at least two symbols belong to different frequency bands.

14. The communication device according to claim 12, wherein the mapping rule further comprises:
if the plurality of frequency bands comprise at least two symbols having the same cutoff time, performing the resource mapping in the at least two symbols based on a second frequency order according to frequencies corresponding to the frequency bands to which the at least two symbols belong respectively, wherein the at least two symbols belong to different frequency bands.

15. The communication device according to claim 11, wherein the mapping rule further comprises:
in each symbol in the plurality of frequency bands, performing the resource mapping based on a third frequency order.

16. The communication device according to claim 10, wherein the mapping rule further comprises:
performing the resource mapping sequentially in a plurality of subcarriers in the plurality of frequency bands based on a fourth frequency order.

17. The communication device according to claim 16, wherein the mapping rule further comprises:
in each of the plurality of subcarriers, performing the resource mapping according to a chronological order.

18. The communication device according to claim 10, wherein the preset mapping rule further comprises: an increasing order in time domain within each unit time domain resource of the plurality of unit time domain resources.

19. A non-transitory computer readable storage medium, wherein a time-frequency resource for transmitting current data comprises a plurality of frequency bands, and subcarrier spacings corresponding to the plurality of frequency bands are at least partially different, the computer readable storage medium storing a program causing a terminal device to perform:
determining a unit time domain resource for resource mapping, a length of the unit time domain resource being equal to a symbol length corresponding to a minimum subcarrier spacing of the plurality of frequency bands; and
performing resource mapping on the data in a plurality of unit time domain resources for transmitting the data according to an increasing order in time domain, wherein the resource mapping performed in each of the plurality of unit time domain resources is performed based on a preset mapping rule.

* * * * *